United States Patent
Goggin

(10) Patent No.: US 9,453,582 B2
(45) Date of Patent: Sep. 27, 2016

(54) RUPTURE DISK AND HINGE

(75) Inventor: Paul Goggin, Nenagh (IE)

(73) Assignee: BS&B Safety Systems Limited, Raheen (IE)

( * ) Notice: Subject to any disclaimer, the term of this patent is extended or adjusted under 35 U.S.C. 154(b) by 180 days.

(21) Appl. No.: 13/573,419

(22) Filed: Sep. 14, 2012

(65) Prior Publication Data
US 2013/0192688 A1 Aug. 1, 2013

Related U.S. Application Data

(60) Provisional application No. 61/573,160, filed on Sep. 16, 2011.

(51) Int. Cl.
*F16K 17/40* (2006.01)
*F16K 17/16* (2006.01)

(52) U.S. Cl.
CPC ......... *F16K 17/162* (2013.01); *F16K 17/1606* (2013.01); *F16K 17/1613* (2013.01); *F16K 17/1626* (2013.01); *Y10T 137/1692* (2015.04); *Y10T 137/1729* (2015.04)

(58) Field of Classification Search
CPC ............ F16K 17/162; F16K 17/1606; F16K 1/1613; F16K 17/1626; Y10T 137/1729; Y10T 137/1692; Y10T 137/1699; Y10T 137/1737; Y10T 137/1744; Y10T 137/1752
USPC .................... 137/68.25, 68.19, 68.21, 68.26, 137/68.27–29
See application file for complete search history.

(56) References Cited

U.S. PATENT DOCUMENTS

| | | | |
|---|---|---|---|
| 2,922,544 A | 1/1960 | Hibbard et al. | |
| 3,722,734 A | 3/1973 | Raidl, Jr. | |
| 4,236,648 A * | 12/1980 | Wood et al. | 220/89.3 |
| 4,269,214 A * | 5/1981 | Forsythe et al. | 137/68.28 |
| 4,404,982 A | 9/1983 | Ou | |
| 4,441,350 A | 4/1984 | Short, III et al. | |
| 4,481,850 A | 11/1984 | Allen | |

(Continued)

FOREIGN PATENT DOCUMENTS

| | | |
|---|---|---|
| EP | 0437019 A2 | 7/1991 |
| WO | WO 01/41456 A1 | 4/2011 |

OTHER PUBLICATIONS

PCT Notification International Search report, PCT/IB2012/002249, date of mailing: Mar. 6, 2013, International filing date: Sep. 27, 2012.

(Continued)

*Primary Examiner* — Kevin Murphy
*Assistant Examiner* — Minh Le
(74) *Attorney, Agent, or Firm* — Finnegan, Henderson, Farabow, Garrett & Dunner LLP

(57) ABSTRACT

A hinge assembly for a rupture disk is disclosed. More particularly, a hinge assembly is disclosed having a first hinge member with a flange body and a collapsible hinge, and a second hinge member with a platform hinge, wherein the collapsible hinge is configured to be positioned between the platform hinge and a rupture disk. A rupture disk hinge is also disclosed, having a flange body and a collapsible hinge extending from the flange body. The collapsible hinge may have an approach extending from the flange body, a platform extending from the approach, and a lip extending from the platform. A rupture disk hinge also is disclosed having a hinge extension that extends along a diameter of a flange body across a central fluid flow path.

38 Claims, 20 Drawing Sheets

(56) References Cited

U.S. PATENT DOCUMENTS

| | | | |
|---|---|---|---|
| 4,597,505 A * | 7/1986 | Mozley et al. | 220/89.2 |
| 4,657,157 A | 4/1987 | Short, III | |
| 4,759,460 A * | 7/1988 | Mozley | 220/89.2 |
| 5,082,133 A | 1/1992 | Farwell et al. | |
| 5,167,337 A * | 12/1992 | Short et al. | 220/89.2 |
| 5,305,775 A | 4/1994 | Farwell | |
| 5,467,886 A * | 11/1995 | Hinrichs | 220/89.2 |
| 5,934,308 A | 8/1999 | Farwell | |
| 6,006,938 A * | 12/1999 | Mozley et al. | 220/89.2 |
| 6,178,983 B1 | 1/2001 | Culliinane et al. | |
| 6,321,582 B1 | 11/2001 | Cullinane et al. | |
| 6,349,737 B2 * | 2/2002 | Muddiman et al. | 137/68.29 |
| 6,446,653 B2 | 9/2002 | Cullinane et al. | |
| 6,494,074 B2 | 12/2002 | Cullinane et al. | |
| 6,945,420 B2 * | 9/2005 | Krebill et al. | 220/89.2 |
| 6,959,828 B2 | 11/2005 | Eijkelenberg et al. | |
| 7,308,903 B2 * | 12/2007 | Rooker et al. | 137/68.29 |
| 7,600,527 B2 * | 10/2009 | Shaw et al. | 137/68.27 |
| 2001/0052358 A1 * | 12/2001 | Cullinane et al. | 137/68.25 |
| 2005/0103786 A1 | 5/2005 | Eijkelenberg et al. | |
| 2008/0060702 A1 * | 3/2008 | Muddiman | 137/68.27 |
| 2010/0258200 A1 * | 10/2010 | Walker et al. | 137/68.25 |
| 2013/0056085 A1 * | 3/2013 | Tomasko et al. | 137/14 |

OTHER PUBLICATIONS

BS&B Safety Systems, VAC-SAF™ System, Cat. No. 77-8006, Section C-8, *available at* http://www.bsbsystems.com/brochures/77-8006_VAC_SAF.pdf (last accessed Apr. 5, 2013).

BS&B Safety Systems, RB-90™ Reverse Buckling Disks, Cat. No. 77-4006 (2008), *available at* http://www.bsbsystems.com/brochures/77-4006-RB90.pdf (last accessed Apr. 5, 2013).

BS&B Safety Systems, The Sta-Safe® System, Cat. No. 77-4001, Section D, Rev. 1 (Jan. 2009), *available at* http://www.bsbsystenns.com/brochures/77-4001-Sta-Saf.pdf (last accessed Apr. 5, 2013).

European Patent Office, EPO Communication pursuant to Article 94(3) EPC, Application No. 12 806 107.4-1754, Issued Sep. 30, 2015 (6 pages total).

State Intellectual Property Office of China, First Notification of Office Action, Application No. 201280056121.7, Issued Sep. 30, 2015, plus English-language translation (9 pages total).

\* cited by examiner

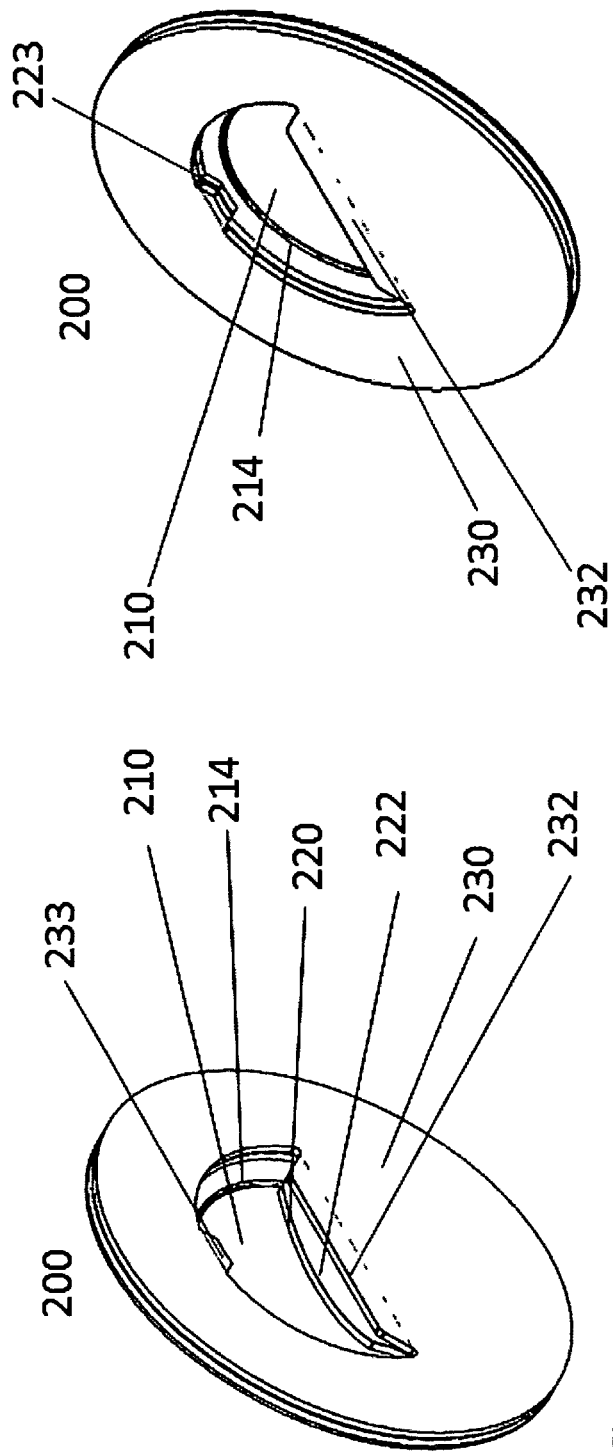

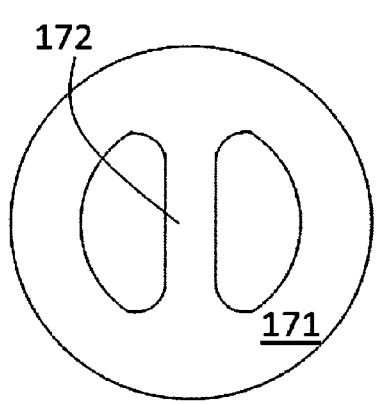 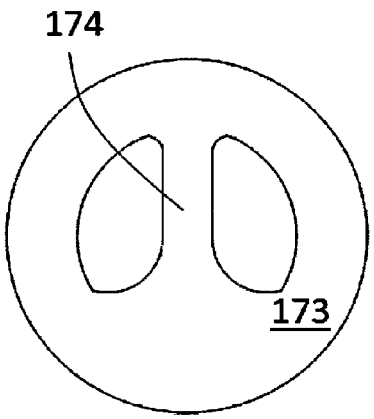 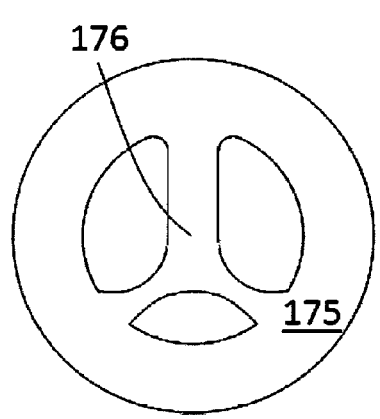
Fig. 17A  Fig. 17B  Fig. 17C
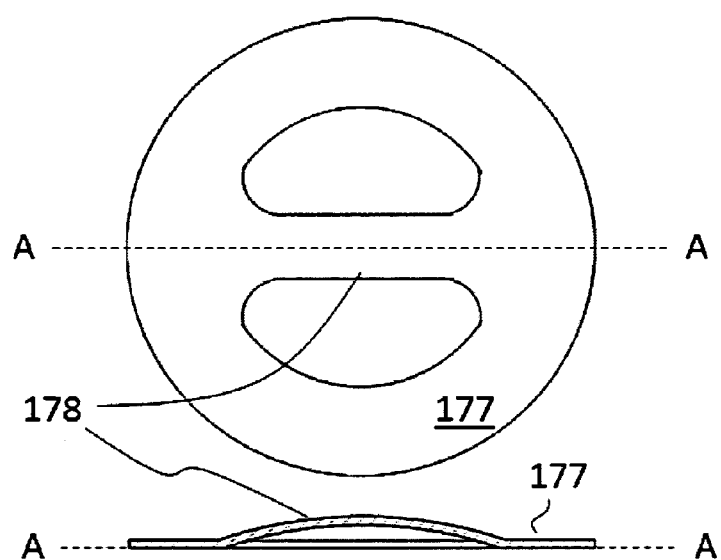
Fig. 17D

RUPTURE DISK AND HINGE

CROSS REFERENCE TO RELATED APPLICATION

This application claims the benefit of U.S. Provisional Application No. 61/573,160, filed Sep. 16, 2011, by Paul Goggin and titled RUPTURE DISK AND HINGE, the disclosure of which is expressly incorporated herein by reference.

FIELD OF THE DISCLOSURE

This disclosure generally relates to a rupture disk and hinge. More specifically, this disclosure relates to a rupture disk and a hinge providing improved performance.

BACKGROUND

A rupture disk is disclosed in co-owned U.S. patent application Ser. No. 12/923,622, filed Sep. 29, 2010, by John Tomasko, Paul Goggin, and Geof Brazier, and titled RUPTURE DISK, the disclosure of which is hereby expressly incorporated herein by reference. A rupture disk is also disclosed in co-owned Patent Cooperation Treaty Application No. PCT/US10/50779, filed Sep. 29, 2010, by John Tomasko, Paul Goggin, and Geof Brazier, titled RUPTURE DISK, and published as PCT Pub. No. WO/2011/041456, the disclosure of which is hereby expressly incorporated herein by reference.

A rupture disk is used to release pressure from a pressurized system in response to a potentially dangerous overpressure situation. Generally, a rupture disk has a flange that is sealed between a pair of support members, or safety heads, forming a pressure relief assembly. The pressure relief assembly may then be clamped or otherwise sealingly disposed between a pair of conventional pipe flanges or between a pair of threaded fittings, or attached to one such threaded fitting, in the pressurized system. The pressure relief assembly may be installed using such techniques as welding, soldering, crimping or mechanical clamping to hold the sandwich of components together. A first pipe conducts pressurized fluid to one side of the pressure relief assembly, and a second pipe provides an outlet to a safety reservoir or may be open to the environment. The support members include central openings that expose a portion of the rupture disk to the pressurized fluid in the system. The exposed portion of the rupture disk will rupture when the pressure of the fluid reaches a predetermined differential pressure between the inlet and outlet sides. The ruptured disk creates a vent path that allows fluid to escape through the outlet to reduce the pressure in the system.

A rupture disk may also be used to relieve pressure from a system without being placed between two pipe flanges. For example, a pressurized system may have an outlet member or opening through which fluid may be vented or released— e.g., into the environment or a container. A rupture disk may be installed at such an outlet member or opening to control the pressure at which fluid may be released. For example, a rupture disk may be welded to an outlet member or welded to cover an outlet opening. Additionally or alternatively, a rupture disk may be attached to a pressurized system's outlet by clamping, bolting, riveting, or any other suitable mechanism.

A rupture disk typically has a dome-shaped, rounded-shaped, conical shape, truncated conical shape, or other generally curved rupturable portion and can be either forward-acting or reverse-acting. A forward-acting rupture disk is positioned with the concave side of the rupturable portion exposed to the pressurized system, placing the disk under tension. Thus, when an over-pressure condition is reached— i.e., when the system pressure exceeds a safe or desirable level—the rupture disk may release pressure by bursting outward. Conversely, a reverse-acting rupture disk (also known as a reverse buckling rupture disk) is positioned with its convex side exposed to the pressurized system, placing the material of the disk under compression. Thus, when an over-pressure condition is reached, the rupture disk may buckle and reverse—i.e., invert—and tear away to vent pressurized fluid.

A reverse buckling rupture disk may rupture by itself upon reversal. Alternatively, additional features may be provided to facilitate rupture. For example, a cutting structure or stress concentration point may contact the reverse buckling rupture disk on reversal, ensuring that rupture occurs. Exemplary cutting structures include one or more blades (e.g., a four-part blade like that provided by BS&B Safety Systems as part of the commercially available RB-90™ reverse buckling disk, or a tri-shaped three-part blade like that provided by BS&B Safety Systems as part of the commercially available DKB VAC-SAF™ rupture disk) and circular toothed rings (e.g., like that provided by BS&B Safety Systems as part of the commercially available JRS™ rupture disk). Other exemplary cutting structures may be positioned along the periphery of a rupturable portion. Still other exemplary cutting structures may be positioned in an X-shape, Y-shape, or irregular Y-shape designed to engage with the rupturable portion upon reversal.

Rupture disk assemblies using cutting structures are described in co-owned U.S. Pat. Nos. 4,236,648 and 5,082,133, the contents of which are hereby expressly incorporated by reference in their entirety. Exemplary stress concentration points are described in co-owned U.S. Pat. No. 5,934,308, the contents of which are hereby expressly incorporated by reference in their entirety.

The predetermined pressure differential at which a rupture disk will rupture is known as the "burst pressure." The burst pressure for which a rupture disk is rated is known as the "nominal burst pressure." The burst pressure may be set by way of the rupture disk's physical parameters, such as material thickness and dome height (also known as "crown height"). The burst pressure also may be set using various physical features, such as indentations. A rupture disk having an indentation—and methods of manufacturing such rupture disks—is disclosed, for example, in co-owned U.S. Pat. Nos. 6,178,983, 6,321,582, 6,446,653, and 6,494,074, the contents of which are hereby incorporated by reference in their entirety.

Physical features, such as score lines and shear lines (and other areas of weakness, also known as lines of weakness), may be used to facilitate opening of a rupture disk and control the opening pattern of a rupture disk. In a reverse buckling disk, for example, the disk will tear along a score line when the disk is reversing. A score or shear line may be used in combination with a stress concentration point or cutting member. Selected portions of the disk may be left unscored, acting as a hinge area, to prevent the disk from fragmenting upon bursting and the fragments from the disk escaping along with fluid from the pressurized system. A central portion of the disk that is partially torn away from the rest of the disk may be referred to as a "petal."

Fragmentation of a rupture disk is also controlled through use of a transition area. The transition area appears between a rupture disk's dome and flange portions. The rupture disk industry has focused on using a transition area with a fixed radius to assist with fragmentation control.

Fragmentation may also be controlled through the use of a peripheral hinge located downstream of a rupture disk. The industry has typically focused on achieving the maximum open area possible from a rupture disk device, at least in part to maximize the flow rate when the rupture disk device activates or opens. As a result of that focus, a known rupture disk device has typically minimized the open area occupied by a downstream peripheral hinge. Usually, a downstream hinge occupies less than 15% of the possible opening area.

In light of the foregoing, it may be desirable to combine one or more of the foregoing features to ensure reliable performance of a rupture disk, and to prevent fragmentation of a rupture disk. It may be desirable to avoid reinforcing a score line or other area of weakness after the domed structure collapses. It may also desirable to provide support to an unscored hinge area of a rupture disk, to prevent the disk from fragmenting upon bursting. Alternatively, it may be desirable to reinforce a portion of the scored area of a rupture disk, to arrest the tearing of the score line and effectively create a hinge to retain the rupture disk petal. It may also be desirable to provide a feature that may absorb burst energy from a burst rupture disk. For example, it may be desirable to absorb the kinetic energy of a rupture disk petal to decelerate the petal. The rupture disk and hinge assembly of the present disclosure achieve these, or other, advantages.

SUMMARY

To attain one or more of the above or other advantages, as embodied and broadly described herein, the disclosure is directed to a hinge assembly for a rupture disk having a rupturable domed portion, the hinge assembly comprising a first hinge member comprising a flange body and a collapsible hinge, and a second hinge member comprising a platform hinge. The collapsible hinge is configured to be positioned between the rupturable domed portion of the rupture disk and the platform hinge.

The disclosure is further directed to a rupture disk assembly comprising a rupture disk, the rupture disk comprising a flange portion and a domed portion, wherein the domed portion has a concave surface. The assembly further comprises a first hinge member comprising a flange body and a collapsible hinge and a second hinge member comprising a flange body and a platform hinge. The flange body of the first hinge member is configured to be sealed between the flange portion of the rupture disk and the flange body of the second hinge member.

The disclosure is also directed to a rupture disk hinge comprising a flange body and a collapsible hinge, wherein the collapsible hinge comprises an approach extending from the flange body, a platform extending from the approach, and a lip extending from the platform.

The disclosure also is directed to a rupture disk hinge comprising a flange body defining a plane and a collapsible hinge. The collapsible hinge comprises a first hinge extension extending from the flange body at a first angle relative to the plane of the flange body and a second extension extending from the first hinge extension at a second angle relative to the plane of the flange body.

The disclosure is still further directed to a rupture disk hinge assembly comprising a flange body defining a central fluid flow path and a hinge extension extending along a diameter of the flange body across the central fluid flow path.

BRIEF DESCRIPTION OF THE DRAWINGS

The accompanying drawings, which are incorporated in and constitute a part of this specification, illustrate several embodiments and together with the description, serve to explain principles of the disclosure.

FIGS. 6A and 6B illustrate views of an assembled rupture disk assembly according to the embodiment of FIG. 5.

FIGS. 12A and 12B are views from the inlet or upstream side. FIG. 12C is a view from the outlet or downstream side. FIGS. 12D and 12E are cut-away views. FIG. 12F is a cut-away profile view.

FIGS. 13A and 13B are views from the inlet or upstream side. FIGS. 13C and 13D are views from the outlet or downstream side. FIGS. 13E and 13F are cut-away views. FIG. 13G is a cut-away profile view.

FIG. 16A is a view from the inlet side, i.e., upstream. FIG. 16B is a view from the outlet side, i.e., downstream. FIG. 16C is a view at an oblique angle from the outlet side.

FIGS. 17A-17D illustrate various hinge members having a hinge section. FIGS. 17A, 17B, and 17C are views from the top of various hinge members. FIG. 17D illustrates a view from the top and a cross-sectional view along line A-A of a hinge member.

DESCRIPTION OF THE EMBODIMENTS

Reference will now be made in detail to the present exemplary embodiments, examples of which are illustrated in the accompanying drawings.

Figure 1:
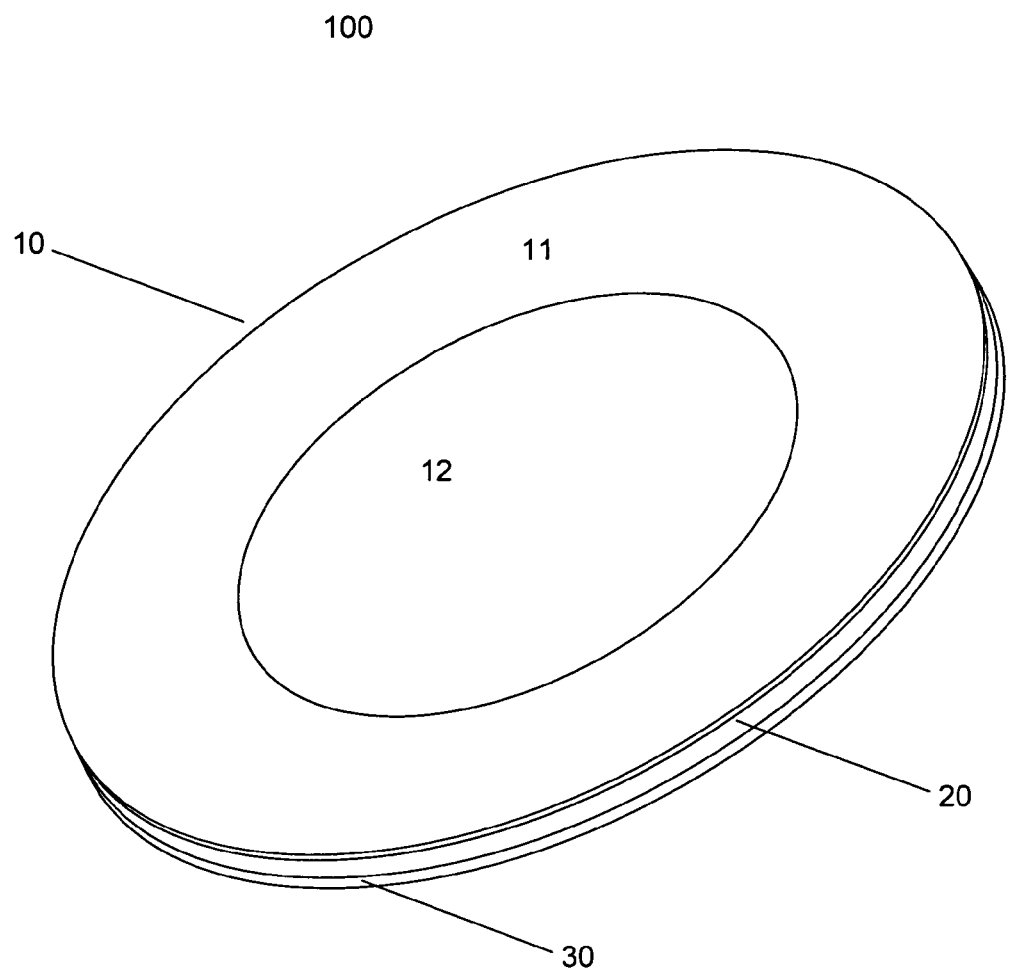
FIG. 1 illustrates an embodiment of a rupture disk assembly in accordance with the present disclosure.

FIG. 1 illustrates a rupture disk assembly 100, which includes a rupture disk 10 and a two-piece hinge assembly. The hinge assembly may be made of a first hinge member 20 and a second hinge member 30. The rupture disk 10 may include a flange 11 and a domed portion 12.

The rupture disk 10 of FIG. 1 is a reverse-acting rupture disk. Although a reverse-buckling rupture disk is illustrated, it is also contemplated that the present disclosure may alternatively be used with a forward-acting rupture disk.

Figure 2:
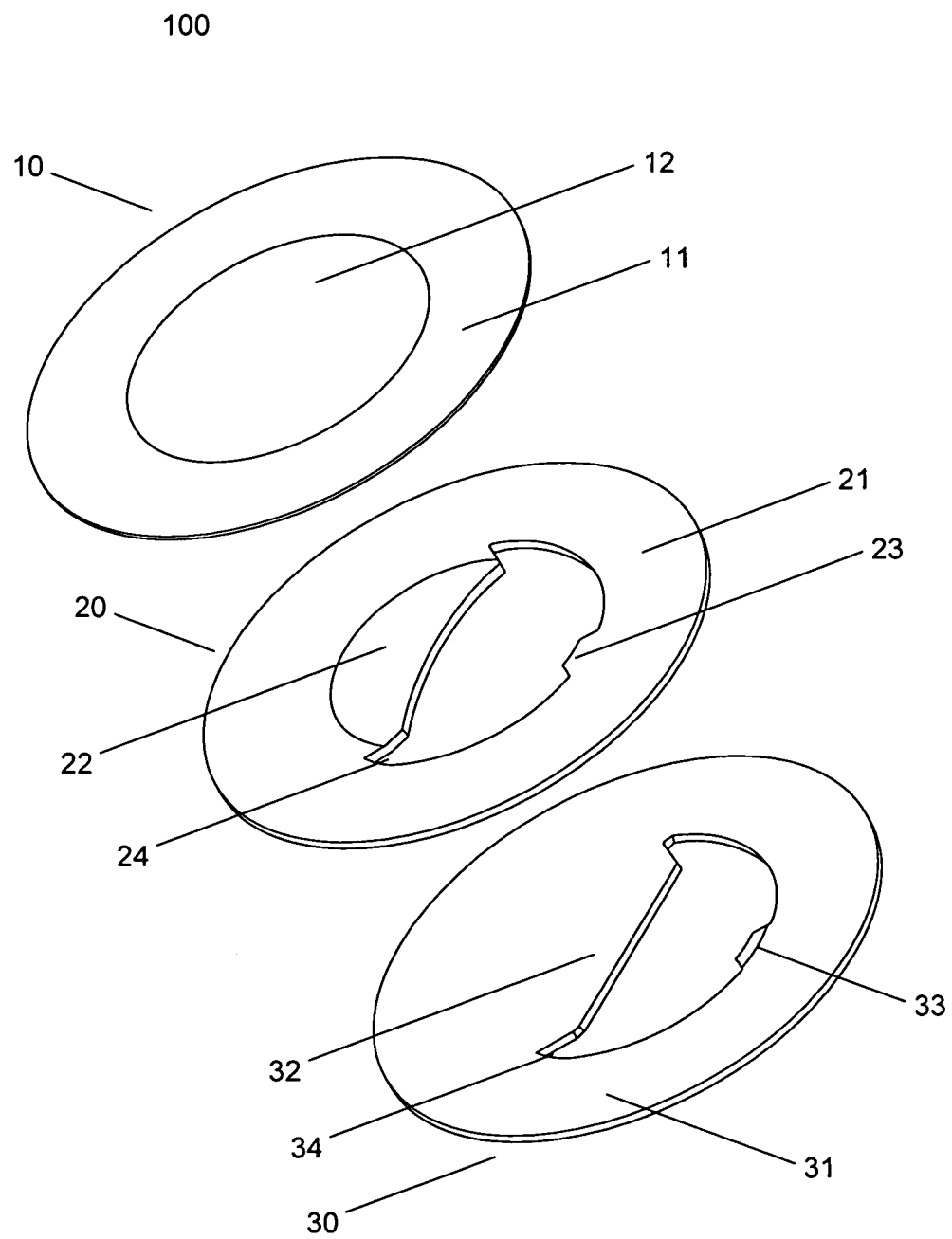
FIG. 2 illustrates an exploded view of the rupture disk assembly of FIG. 1.

FIG. 2 is an exploded view of the rupture disk assembly 100 shown in FIG. 1. FIG. 2 illustrates the rupture disk 10, first hinge member 20, and second hinge member 30. The first hinge member 20 may include a flange body 21, a collapsible hinge 22, and a stress concentration point 23. The collapsible hinge 22 may have a substantially straight edge, and the inner perimeter of the first hinge member 20 may form an essentially "D-shaped" opening. Alternatively, the collapsible hinge may have a rounded or irregularly shaped edge (not shown in FIG. 2). A notch 24 may be provided at each side of the collapsible hinge 22 where the collapsible hinge 22 meets the flange body 21. The notch 24 may be sized and shaped to achieve a desired deformation of the collapsible hinge 22. Additionally, the notch 24 may allow for the perimeter or extremity of a rupture disk petal (i.e., after the disk has ruptured) to wrap around the collapsible hinge 22, thereby preventing fragmentation and further assisting in retention of the rupture disk petal.

As illustrated in FIG. 2, the second hinge member 30 may include a flange body 31, a platform hinge 32, and a stress concentration point 33. The platform hinge 32 may have a substantially straight edge, and the inner perimeter of the second hinge member 30 may form an essentially "D-shaped" opening. Alternatively, the platform hinge may have a rounded or irregularly shaped edge (not shown in FIG. 2). A notch 34 may be provided at each side of the platform hinge 32 where the platform hinge 32 meets the flange body 31 of the second hinge member 30. It may be desirable that the platform hinge 32 be allowed to bend or deform when the collapsible hinge 22 collapses against it. The notches in a second hinge member 30—including their size and shape—may be configured to achieve the desired amount of bending or deformation. Additionally, the notch 34 may allow for a rupture disk petal to wrap around the platform hinge 32, thereby preventing fragmentation and further assisting in retention of the petal.

As illustrated in FIG. 2, the hinge elements of the first and second hinge members 20, 30 occupy nearly 50% of the possible opening area of the rupture disk 10. In a known rupture disk, as noted above, a peripheral downstream hinge typically occupies no more than 15% of the possible opening area of the rupture disk. It has been discovered that increasing the hinge size to occupy between 15% and 50% of the possible opening area provides an increased area for interaction between the rupture disk and the hinge, which may be beneficial for fragment control purposes and for energy absorption. Such features may become particularly important at higher burst pressures, which can be characterized as 500 psig and above. Accordingly, increasing hinge size as disclosed may offer advantages over a known hinge.

Although both the first and second hinge members 20, 30 are illustrated in FIG. 2 with a stress concentration point 23, 33, it is contemplated that a hinge assembly may be provided without a stress concentration point. It is also contemplated that a stress concentration point may be provided on one, but not both, of the hinge members. Additionally, although the stress concentration point 23, 33 of both hinge members is shown directly across from the collapsible hinge 22 and platform hinge 32, a stress concentration point 23, 33 may be positioned at a different location on one or both of the hinge members. Additionally or alternatively, more than one stress concentration point may be provided. A stress concentration point 23, 33 may be sharp, and may be provided with a cutting point or cutting surface. Alternatively, a stress concentration point 23, 33 may be dull.

Figure 3:
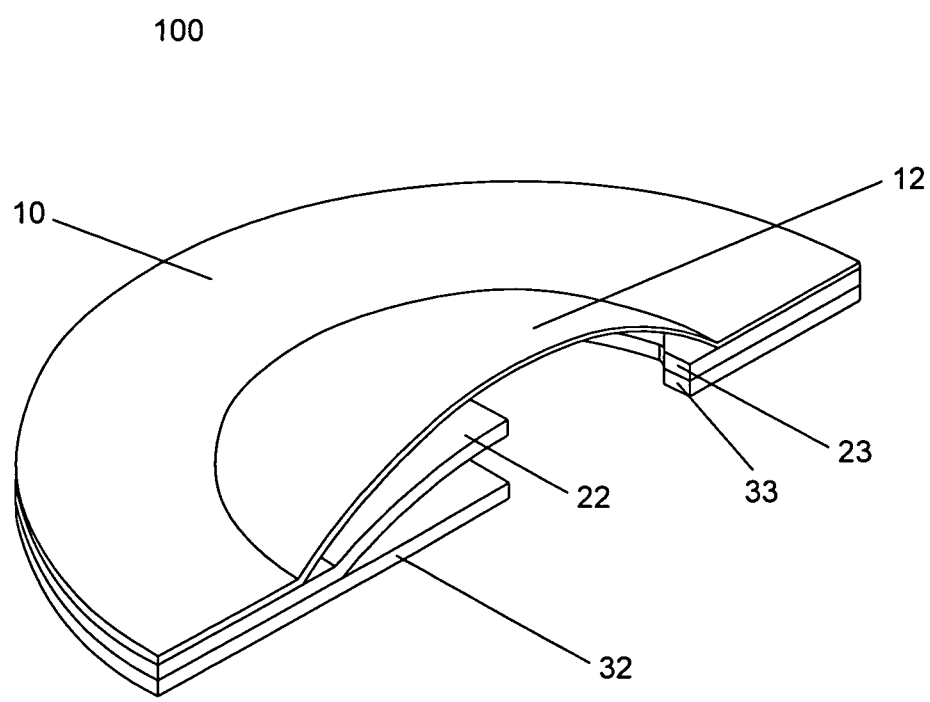
FIG. 3 illustrates a cut-away view of the rupture disk assembly of FIG. 1.

FIG. 3 is a partially cut-away view of the rupture disk assembly 100 shown in FIG. 1. FIG. 3 illustrates the rupture disk 10, first hinge member 20 and second hinge member 30. As illustrated, the collapsible hinge 22 of the first hinge member 20 is positioned between the domed portion 12 of the rupture disk 10 and the platform hinge 32 of the second hinge member 30. Each of the first and second hinge members 20, 30, as illustrated, includes a stress concentration point 23, 33.

Figure 4:
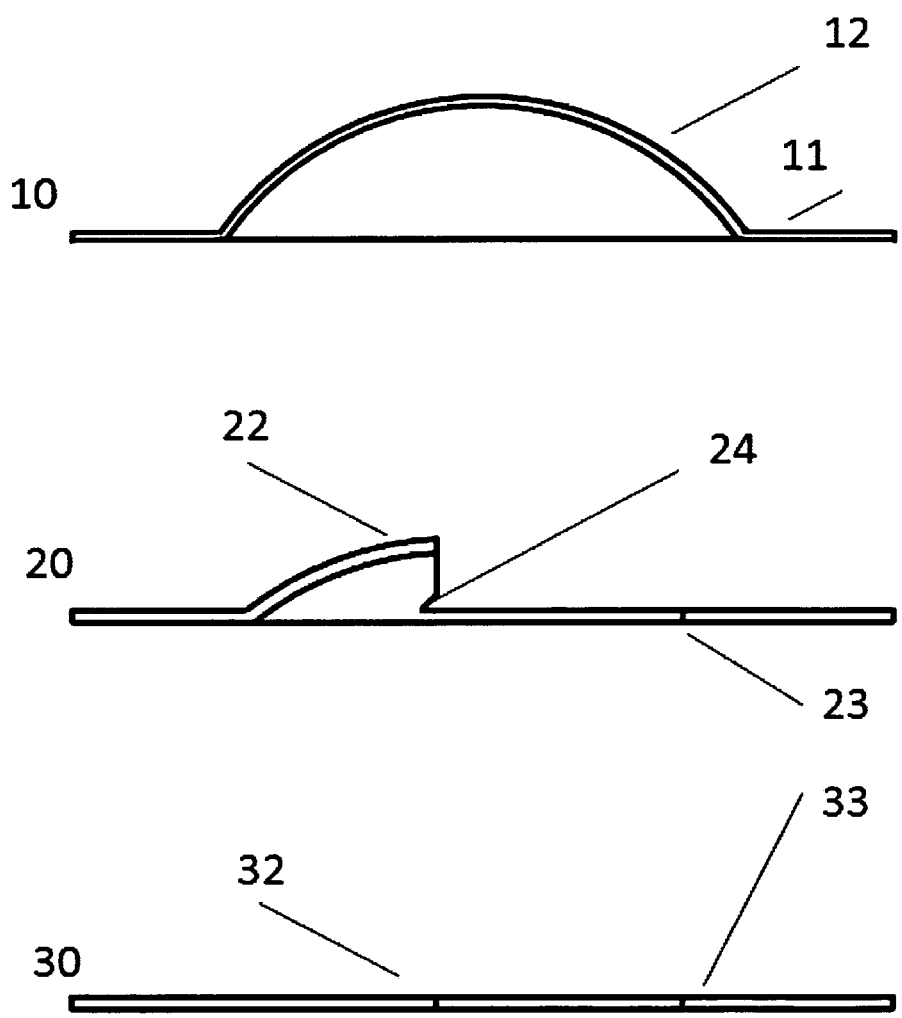
FIG. 4 illustrates a cut-away exploded view of the rupture disk assembly of FIG. 1.

FIG. 4 is a cut-away exploded view of the rupture disk assembly 100 shown in FIG. 1. FIG. 4 illustrates the rupture disk 10, first hinge member 20 and second hinge member 30. As illustrated, the collapsible hinge 22 is configured to rest between the domed portion 12 of the rupture disk 10 and the platform hinge 32 of the second hinge member 30. It is contemplated that the height of the collapsible hinge 22 may be selected to achieve a desired hinge strength and to determine the distance that a rupturing rupture disk 10 may travel before contacting the collapsible hinge 22. If the rupture disk 10 is allowed to travel farther without contacting the collapsible hinge 22, it may achieve greater speeds. While greater speeds may be beneficial to achieve rupture of the rupture disk 10, greater speeds may also lead to increased fragmentation. Accordingly, varying the height of the collapsible hinge 22, as disclosed, may allow a manufacturer to obtain an optimum rupture disk reversal speed. In addition, rupture disks may have varying crown heights depending on a number of factors, e.g., activation pressure, thickness, and material type. The height of the collapsible hinge 22 may also be varied to accommodate these variations. A notch 24 may be provided at the side of the collapsible hinge 22. Each of the first and second hinge members 20, 30, as illustrated, includes a stress concentration point 23, 33. The domed portion 12 of the rupture disk 10 may be spherical and may be provided with a first radius of curvature. The collapsible hinge 22 may take a predominantly spherical shape as well. The collapsible hinge 22 may have the same radius of curvature as the rupture disk 10 or a different radius of curvature. A collapsible hinge 22 may have a radius of curvature that is uniform, or the radius of curvature may vary across the collapsible hinge 22. The radius of curvature of a collapsible hinge 22 may be selected to achieve a desired level of force under which the collapsible hinge 22 may be deformed.

According to the embodiment illustrated in FIG. 4, the edge of the collapsible hinge 22 aligns directly above the edge of the platform hinge 32. In an alternative embodiment, the edge of the collapsible hinge 22 may extend beyond the edge of the platform hinge 32. In yet another alternative embodiment, the edge of the platform hinge 32 may extend beyond the edge of the collapsible hinge 22.

Turning to operation of the rupture disk assembly 100 of FIGS. 1-4, the rupture disk assembly 100 may be installed with the convex surface of the rupture disk's domed portion 12 exposed to a pressurized system. When an overpressure situation occurs, the domed portion 12 of the rupture disk 10 may collapse and tear. Tearing may be initiated at or facilitated by the stress concentration points 23, 33 of the hinge assembly. The torn portion of the rupture disk 10 (the petal) may contact the collapsible hinge 22 of the first hinge member 20. In response, the collapsible hinge 22 may collapse, absorbing energy and momentum from the petal, and slowing down the movement of the petal. As the collapsible hinge 22 collapses, it may contact the platform hinge 32 of the second hinge member 30. The platform hinge 32 may absorb the remaining kinetic energy of both the petal and the collapsible hinge 22. The platform hinge 32 may or may not deform as it absorbs the kinetic energy of the petal and collapsible hinge 22.

The disclosed hinge assembly can provide for a staged decrease in the velocity of a rupture disk petal. The platform hinge 32 may act as a platform for the collapsible hinge 22 to deform against, which may give the collapsible hinge 22 a large bend radius. A large bend radius aids the petal to remain attached (at least in part) to the rest of the rupture disk 10, and prevents or minimizes disk fragmentation. Known hinge designs try to prevent fragmentation of a rupture disk by bringing a petal to an abrupt stop. Abruptly stopping a torn portion may actually lead to increasing undesirable fragmentation; therefore the disclosed two-stage hinge assembly is an improvement over the known hinge designs.

Figure 5:
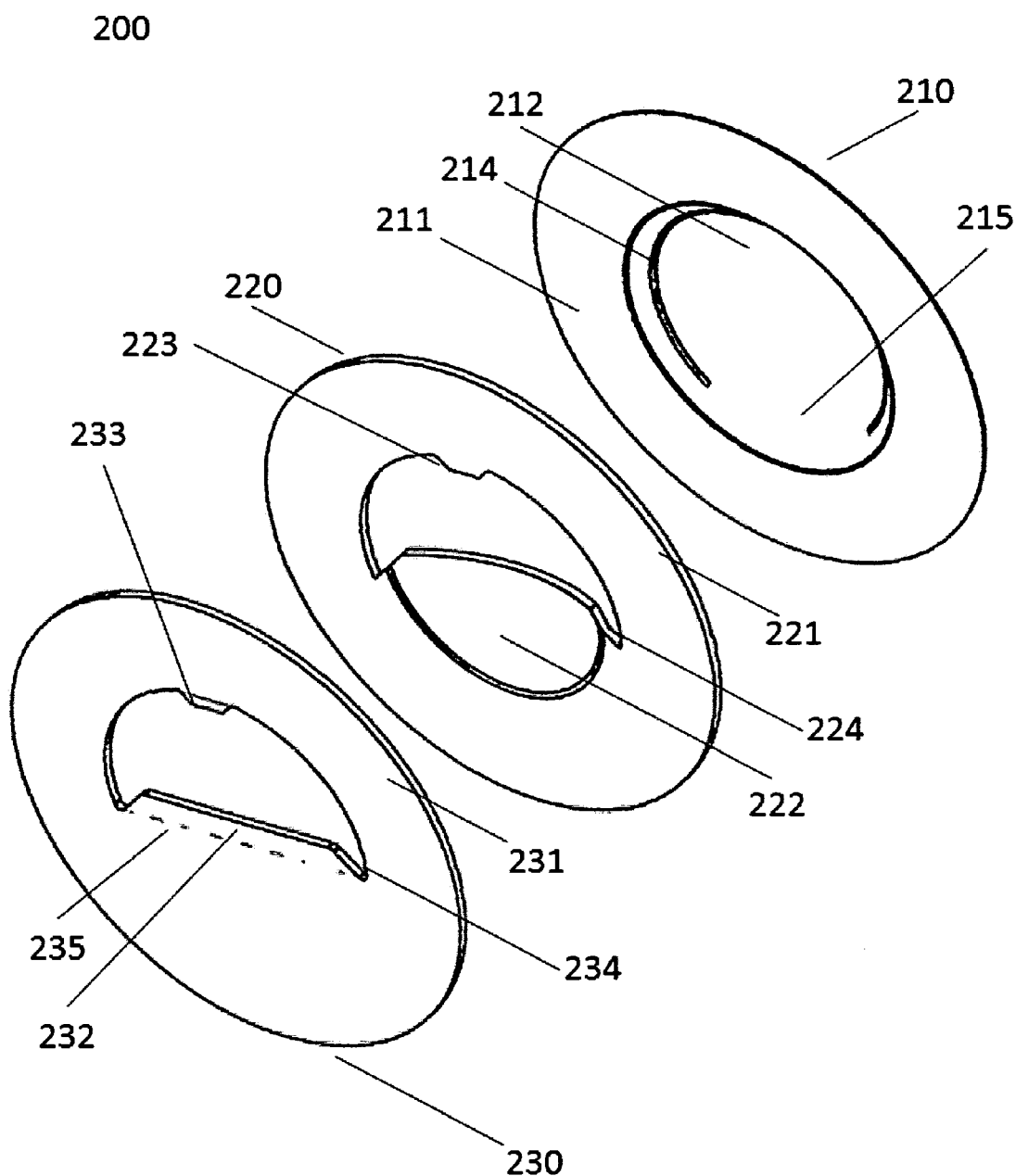
FIG. 5 illustrates another embodiment of a rupture disk assembly in accordance with the present disclosure, in an exploded view.

FIG. 5 illustrates an exploded view of another embodiment of a rupture disk assembly 200 according to the present disclosure. FIG. 5 illustrates a rupture disk 210 and a hinge assembly made of a first hinge member 220 and a second hinge member 230. A rupture disk 210 may include a flange 211 and a domed portion 212. A score line 214, or other area of weakness, is illustrated in the domed portion 212. An area of weakness may be created by scoring, etching, shearing, or other suitable modification to the rupture disk 210. In an alternative embodiment, a transition area may be provided between the domed portion 212 and the flange 211 of a rupture disk 210, and the score line 214 or area of weakness may be provided in or near the transition area.

As illustrated in FIG. 5, a first hinge member 220 may include a flange body, a collapsible hinge 222, and a stress concentration point 223. The inner perimeter of the first hinge member 220 may form an essentially "D-shaped" opening. A notch 224 may be provided at each side of the collapsible hinge 222 where the collapsible hinge 222 meets the flange body. The notch 224 may be sized and shaped to achieve a desired deformation of the collapsible hinge 222. In addition, a notch 224 may allow a rupture disk petal to wrap around the collapsible hinge 222, which can further prevent disk fragmentation.

As also illustrated in FIG. 5, a second hinge member 230 may include a flange body, a platform hinge 232, and a stress concentration point 233. In one embodiment, the platform hinge 232 may be flat—i.e., co-planar with a flange portion of the second hinge member 230. In another embodiment, the platform hinge 232 may be bent at a line of bending 235. The platform hinge 232 may be bent toward or away from the domed portion 212 of the rupture disk 210. The platform hinge 232 may have a substantially straight edge, and the inner perimeter of the second hinge member 230 may form an essentially "D-shaped" opening. Alternatively, the platform hinge 232 may have a rounded or irregularly shaped edge (not shown in FIG. 5). A notch 234 may be provided at each side of the platform hinge 232 where the platform hinge 232 meets the flange body of the second hinge member 230. It may be desirable that the platform hinge 232 be allowed to bend or deform when the collapsible hinge 222 collapses against it. The notches 234 in a second hinge member 230—including their size and shape—may be configured to achieve the desired amount of bending or deformation. In addition, a notch 234 may allow a rupture disk petal to wrap around the platform hinge 232, which can further prevent disk fragmentation.

The score line 214 in FIG. 5 forms only a partial circle, extending, e.g., approximately 300 degrees, and leaving an unscored hinge area 215. It is contemplated that a score line 214 may extend more or less than 300 degrees, as desired, to alter the size of the unscored hinge area 215. It is also contemplated that the score line 214 (or other area of weakness) may form a complete circle—i.e., extend a full 360 degrees. When a rupture disk 210 is provided with a full-circle score line 214, it may tend to rupture along the entire score line 214, allowing the rupture disk 210 to fragment and allowing a central portion of the disk to travel downstream. To prevent disk fragmentation, a hinge assembly (e.g., first and second hinge members 220, 230 as disclosed herein) may be used to reinforce part of the scored portion of the rupture disk 210. Thus, a hinge assembly may influence or dictate the pattern with which a fully scored rupture disk 210 opens, and/or essentially impose a hinge-type functionality on a rupture disk not otherwise provided with a hinge area.

FIGS. 6A and 6B illustrate views of an assembled rupture disk assembly 200 shown in FIG. 5. FIGS. 6A and 6B show a rupture disk 210, a first hinge member 220, and a second hinge member 230. As illustrated, the rupture disk 210 includes a score line 214. The illustrated first hinge member 220 includes a collapsible hinge 222 and a stress concentration point 223. The illustrated second hinge member 230 includes a platform hinge 232 and a stress concentration point 233. It is also contemplated that the hinge assembly be provided without a stress concentration point, with a stress concentration point provided on only one of the hinge members 220, 230, and/or with multiple stress concentration points.

Figure 7A:
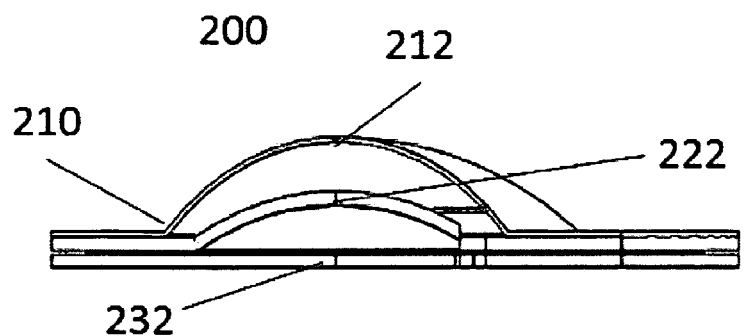
FIGS. 7A and 7B illustrate cut-away views of an assembled rupture disk assembly according to the embodiment of FIG. 5.
Figure 7B:
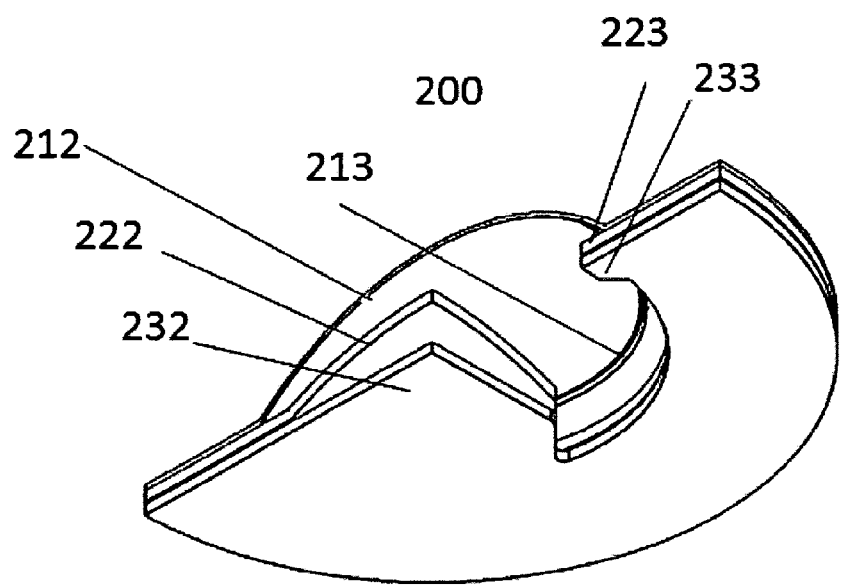

FIGS. 7A and 7B illustrate a partially cut-away view of the assembled rupture disk assembly 200 shown in FIGS. 5, 6A, and 6B. As illustrated, the collapsible hinge 222 of the first hinge member 220 is positioned between the domed portion 212 of the rupture disk 210 and the platform hinge 232 of the second hinge member 230. Each of the first and second hinge members 220, 230, as illustrated, includes a stress concentration point 223, 233.

Turning to operation of the rupture disk assembly 200 of FIGS. 5-7B, the rupture disk assembly 200 may be installed with the convex surface of the rupture disk's domed portion 212 exposed to a pressurized system. When an overpressure situation occurs, the domed portion 212 of the rupture disk 210 may collapse. The collapsed rupture disk 210 may contact the stress concentration point 223 of the first hinge assembly, and the rupture disk 210 may tear along the score line 214, creating a petal of rupture disk 210 material partially detached from the rupture disk 210. The petal may contact the collapsible hinge 222 of the first hinge member 220, causing the collapsible hinge 222 to collapse as it absorbs energy and momentum from the petal and slows down the petal. As the collapsible hinge 222 collapses, it may contact the platform hinge 232 of the second hinge member 230. The platform hinge 232 may absorb the remaining kinetic energy of both the petal and the collapsible hinge 222. The platform hinge 232 may or may not deform as it absorbs the kinetic energy of the petal and collapsible hinge 222.

The two-part hinge design of FIGS. 5-7B, and the two-stage approach to controlling fragmentation of a rupture disk 210, may provide similar advantages to those disclosed in connection with the embodiment illustrated in FIGS. 1-4.

Figure 8:
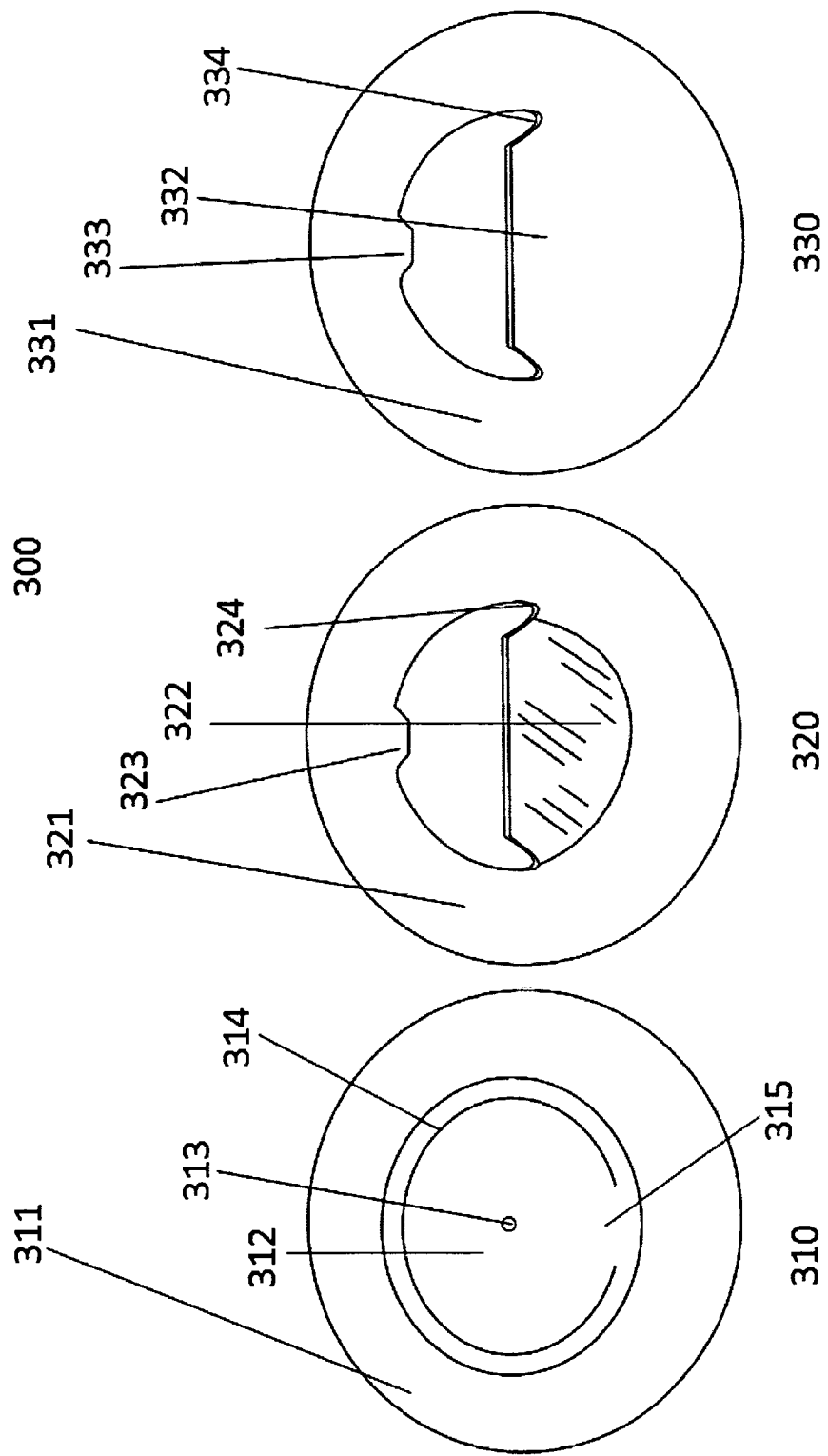
FIG. 8 illustrates the unassembled components of an embodiment of a rupture disk assembly according to the present disclosure.

Another embodiment of a rupture disk assembly 300 is illustrated in FIG. 8. FIG. 8 shows components of a rupture disk assembly 300 in an unassembled or pre-assembled state. A rupture disk 310 may be provided with a flange 311 and a domed portion 312. A rupture disk 310 may also be provided with a score line 314 or other area of weakness. A rupture disk 310 may also be provided with an indentation 313. The indentation 313 may be configured to initiate reversal of the rupture disk 310 at the indentation 313. As illustrated, the indentation 313 is positioned at the apex of the domed portion 312 of the rupture disk 310. It is also contemplated that an indentation 313 may be positioned away from the apex of the domed portion 312. In this manner, the manner in which reversal of the rupture disk 310 occurs may be controlled. An indentation 313 may be provided in a rupture disk 310 in any suitable manner, e.g., by stamping, punching, shearing, or otherwise removing or displacing material. In one embodiment, after an indentation 313 is provided, the indentation 313 may be subject to a second process that smoothes the indentation. As a result, the indentation 313 may not be visible, or may be less visible; however, the material changes to the rupture disk 310 may still achieve a desired controlled reversal of a rupture disk 310.

As illustrated in FIG. 8, a first hinge member 320 of a hinge assembly 300 may have a flange body 321, a collapsible hinge 322, and a stress concentration point 323. A notch 324 may be provided at each side of the collapsible hinge 322 where the collapsible hinge 322 meets the flange body 321. A second hinge member 330 of a hinge assembly 300 may be provided with a platform hinge 332 and a stress concentration point 333. A notch 334 may be provided at each side of the platform hinge 332 where the platform hinge 332 meets the flange body 331 of the second hinge member 330.

Figure 9:
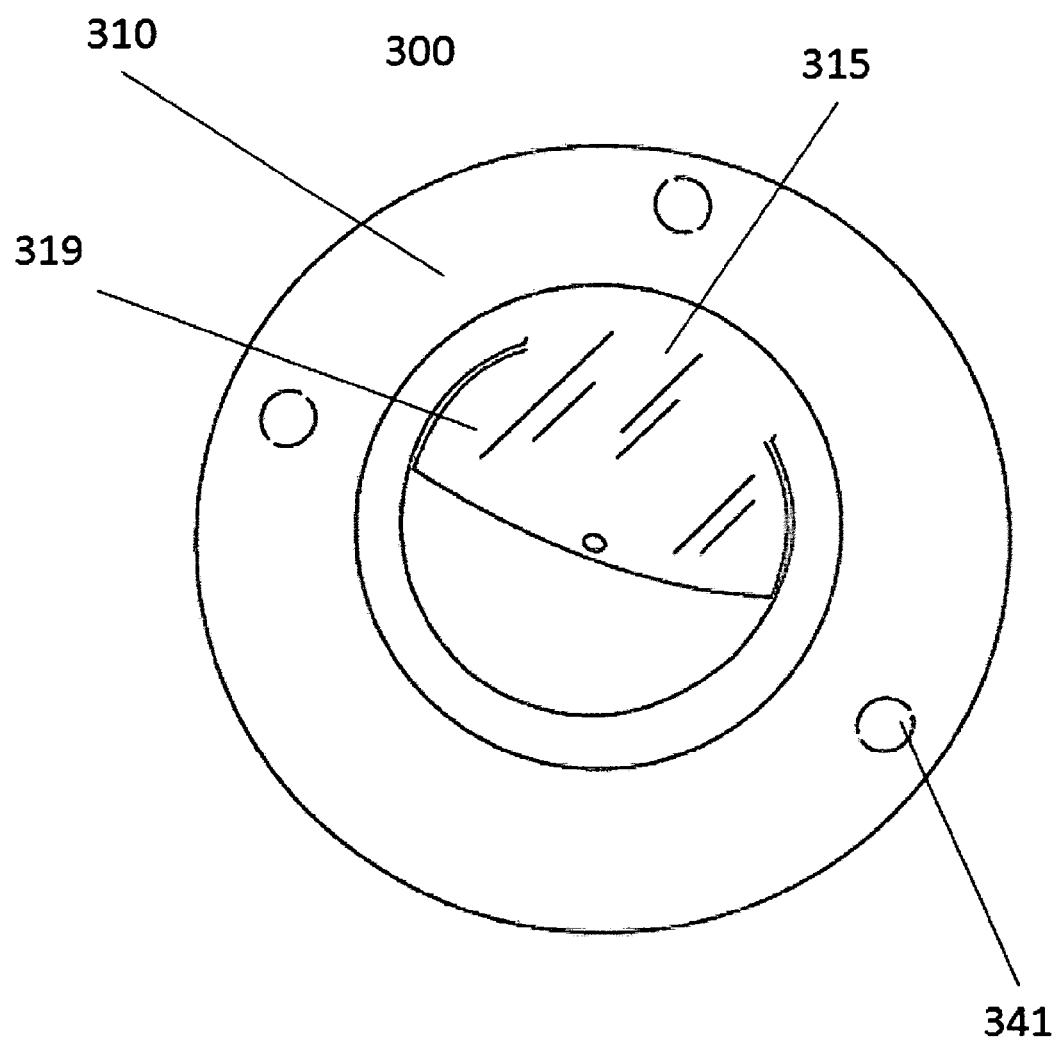
FIG. 9 illustrates an upstream view of an assembled rupture disk assembly according to the embodiment illustrated in FIG. 8 in the post-rupture condition.

FIG. 9 is an upstream view of the embodiment illustrated in FIG. 8. As illustrated, the rupture disk assembly 300 is fully assembled and in a post-rupture condition—i.e., with a rupture disk petal 319 shown partially separated from the rupture disk 310 and connected to the rupture disk 310 by way of a hinge portion 315. Because it is an upstream view, only the rupture disk 310 (and not the hinge members) is visible. As shown in FIG. 9, the rupture disk assembly 300 is assembled with the first and second hinge members (not shown) by way of resistance spot welds 341. A rupture disk 310 and hinge member(s) alternatively may be joined together using any other suitable method, including, e.g., laser welding, sonic welding, perimeter welding, clamping, and/or an adhesive. In particular, if the rupture disk 310 and hinge member(s) are assembled in a cassette-type or sandwich-type assembly, then perimeter welding may be particularly useful. In a cassette-type or sandwich-type assembly, some combination of elements including a rupture disk 310, one or more hinge members, an inlet ring, an outlet ring, a machined inlet and/or a machined outlet may be assembled and welded together around its assembled perimeter. In one embodiment, a rupture disk and hinge members may be held together by one or more safety head members as disclosed in co-owned U.S. Pat. No. 4,751,938, the entire contents of which are hereby expressly incorporated by reference. A rupture disk 310 and hinge member(s) may be provided with keyed features to facilitate and/or ensure proper alignment with each other and/or with a system in which the components may be installed. For example, one or more of the rupture disk 310 and hinge member(s) may have one or more location holes and/or one or more alignment pins.

Figure 10:
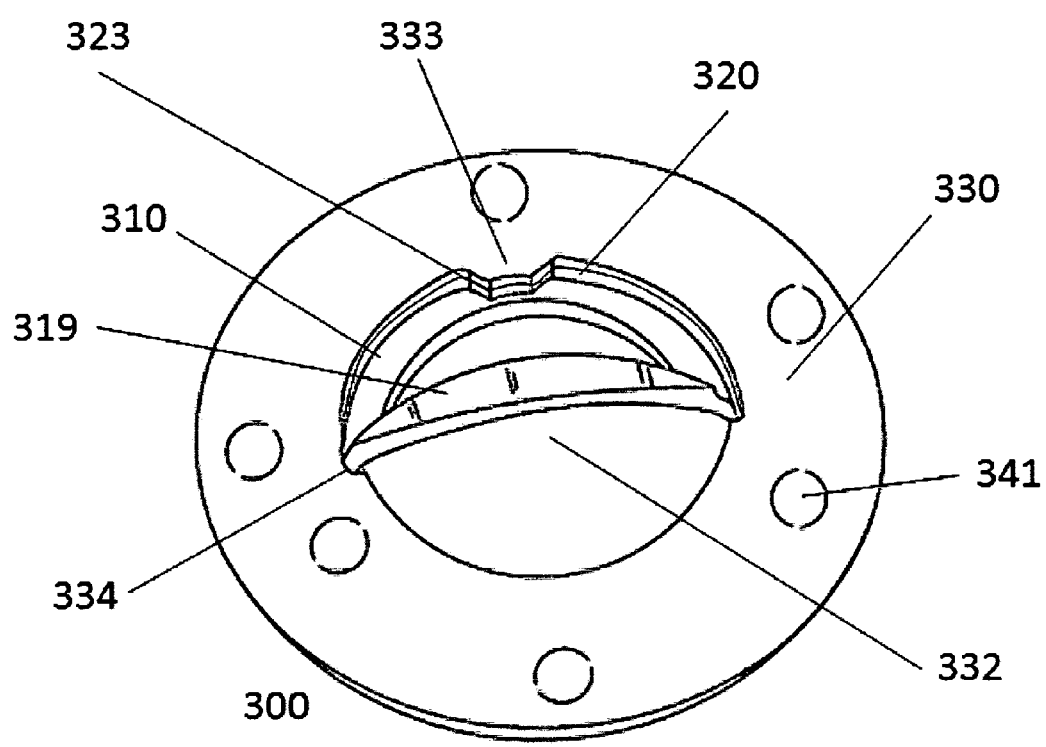
FIG. 10 illustrates a downstream view of an assembled rupture disk assembly according to the embodiment illustrated in FIG. 8 in the post-rupture condition.

FIG. 10 is a downstream view of the embodiment illustrated in FIG. 8, fully assembled and in a post-rupture condition. FIG. 10 illustrates a rupture disk 310, first hinge member 320, and second hinge member 330 joined together by spot welds 341. The first hinge member 320 includes a stress concentration point 323 and the second hinge member 330 includes a stress concentration point 333. As illustrated, the rupture disk 310 has burst (in response to an overpressure condition), creating a petal 319. The platform hinge 332 of the second hinge member 330 (and the collapsible hinge, not shown, of the first hinge member 320) have caught the rupture disk petal 319. The first hinge member 320 is provided with a notch (not shown). The second hinge member 330 is also provided with a notch 334. The notches in the first and second hinge member allow for the perimeter or extremity of the rupture disk petal 319 to wrap around the collapsible hinge (not shown) and/or platform hinge 332.

The rupture disk assembly 300 of FIGS. 8-10 may operate substantially similarly to the assembly 200 of FIGS. 5-7A, with the added feature that the domed portion of the rupture disk 310 may exhibit a more controlled reversal, with reversal being initiated at or near the indentation 313.

Figure 11A:
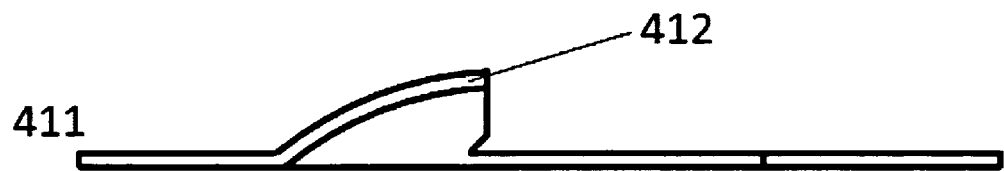
FIGS. 11A-11C illustrate different embodiments of a first hinge member and a collapsible hinge according to the present disclosure.
Figure 11B:
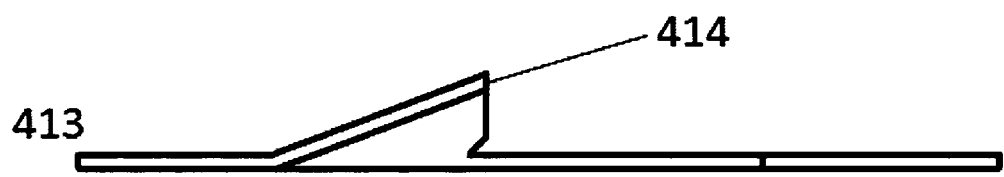
Figure 11C:
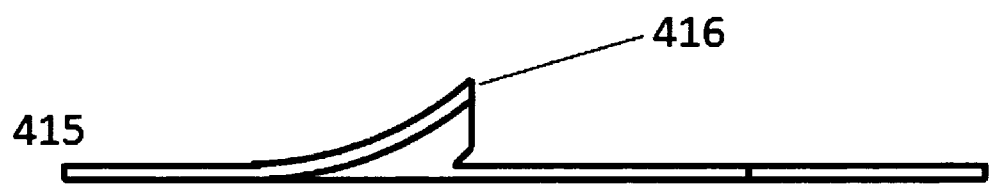

FIGS. 11A to 11C are illustrations of different embodiments of a first hinge member. As described above, a first hinge member 411 may have a collapsible hinge 412 that is spherical in cross-section, and generally follows the spherical shape of a rupture disk's domed portion, as illustrated in FIG. 11A. In another embodiment, a collapsible hinge 414 of a first hinge member 413 may be substantially flat in cross-section, as illustrated in FIG. 11B. In still another embodiment, a first hinge member 415 may be provided with a collapsible hinge 416 that has an inverted spherical shape, which has a curvature opposite that of the rupture disk's domed shape, as illustrated in FIG. 11C.

Figure 12A:
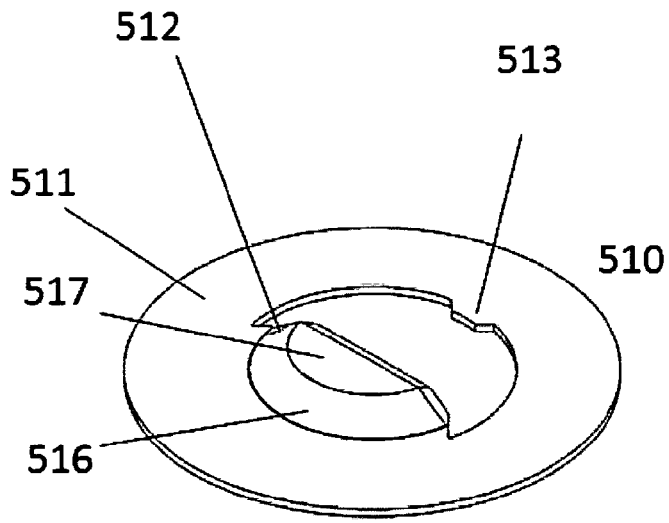
FIGS. 12A-12F illustrate different views of another hinge member according to the present disclosure.
Figure 12B:
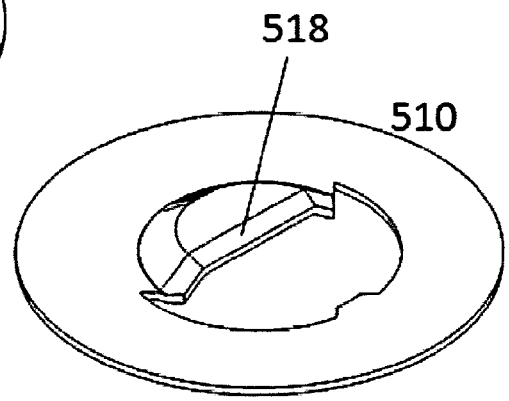
Figure 12C:
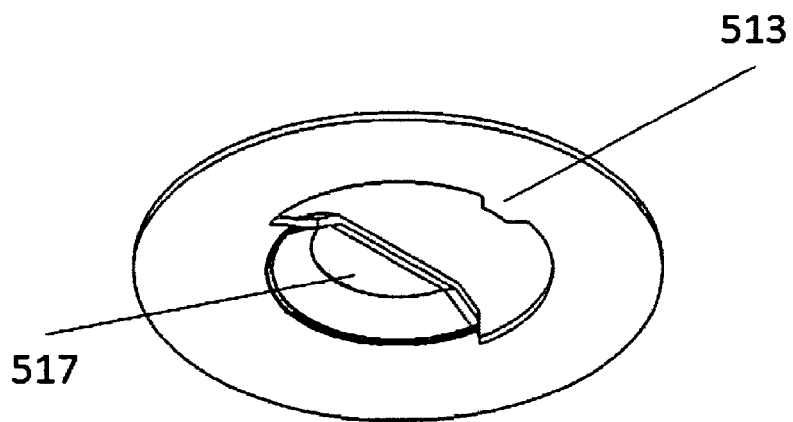
Figure 12D:
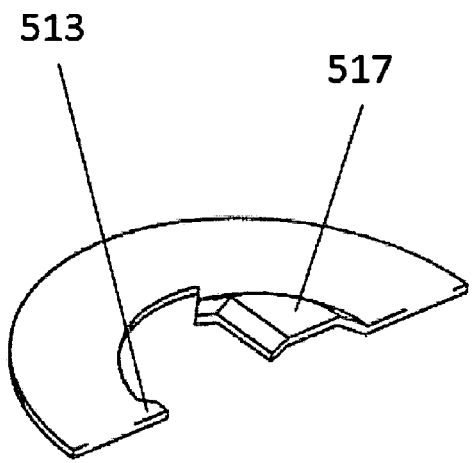
Figure 12E:
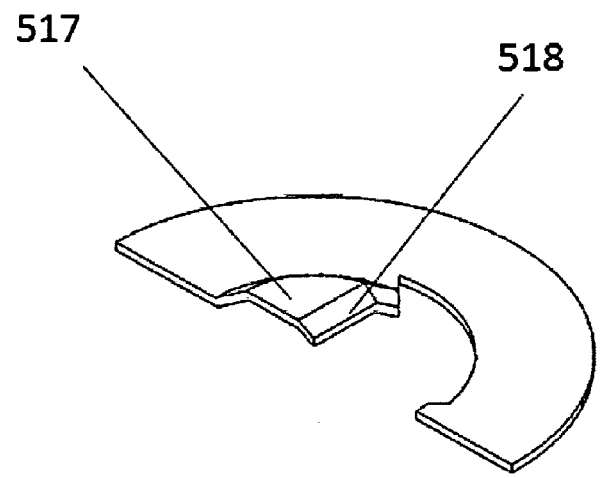
Figure 12F:
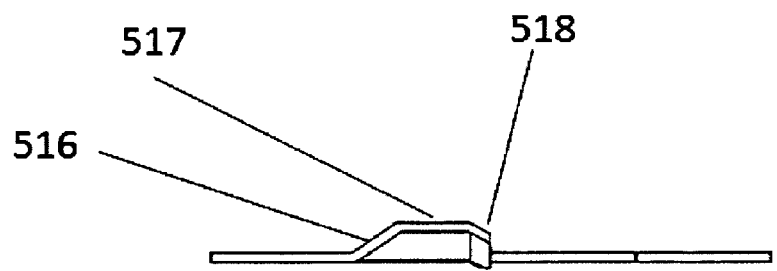

FIGS. 12A to 12F are views of another embodiment of a hinge member 510. As shown in FIGS. 12A to 12F, a hinge member 510 may have a hinge including an approach 516, a step 517, and a lip 518. The hinge member 510 may also have a stress concentration point 513. The approach 516 may extend upward away from a flange body 511 until it reaches a step 517. In one embodiment, the step 517 may be flat and may be substantially horizontal with the flange body 511, as illustrated in FIGS. 12A-12F. In other embodiments, the step may be rounded and/or at an angle to the plane of the flange body. A lip 518 may extend outwardly from the step 517. As illustrated in FIGS. 12A-12F, the lip 518 may extend downward from the step 517, generally in the direction toward the plane of the flange body 511 (as best illustrated in FIG. 12F).

In operation, the hinge member 510 of FIGS. 12A to 12F may be positioned on the outlet side (i.e., downstream) of a rupture disk. When the rupture disk bursts, a rupture disk petal may come into contact with the hinge of the hinge member 510. In response, one or more of the lip 518, step 517, and approach 516 of the hinge may deform in sequence to provide a multi-stage response to rupture disk rupture. In this manner, the hinge member 510 of FIGS. 12A to 12F may achieve a multi-stage response without requiring a second hinge member with a platform hinge. Alternatively, the hinge member 510 of FIGS. 12A to 12F may be used in conjunction with a platform hinge. In that alternative embodiment, the hinge member 510 of FIGS. 12A to 12F may deform or collapse when impacted by a rupture disk petal, thereby absorbing energy and momentum and slowing down the movement of the rupture disk petal. Then, as that hinge member collapses, it may contact the platform hinge of a second member, which may absorb the remaining kinetic energy of the petal and collapsed/collapsing hinge.

Figure 13A:
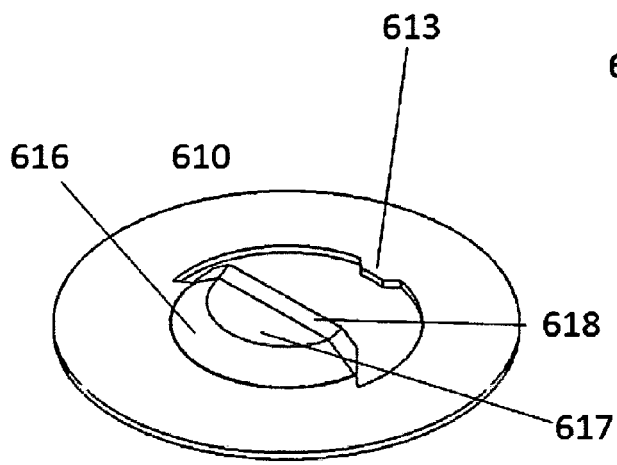
FIGS. 13A-13G illustrate different views of another hinge according to the present disclosure.
Figure 13B:
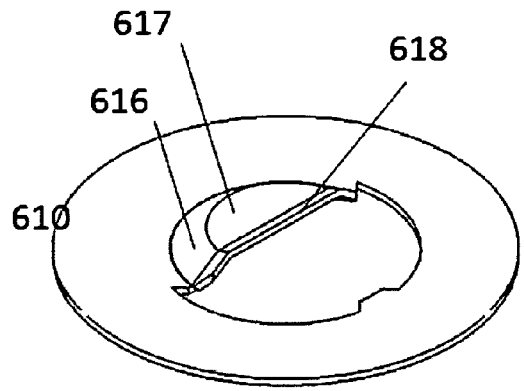
Figure 13C:
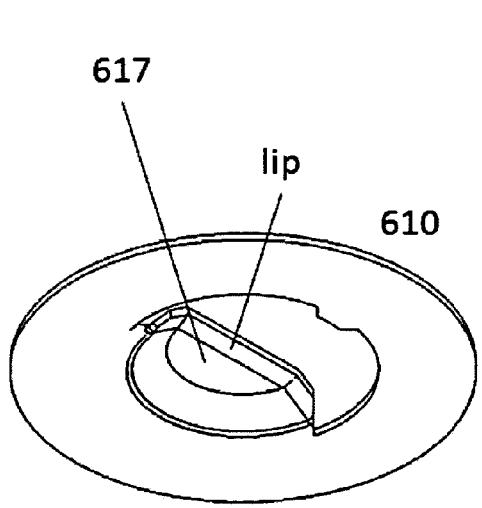
Figure 13D:
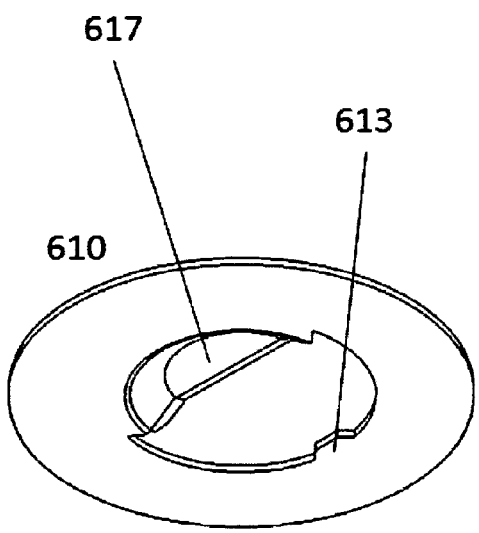
Figure 13E:
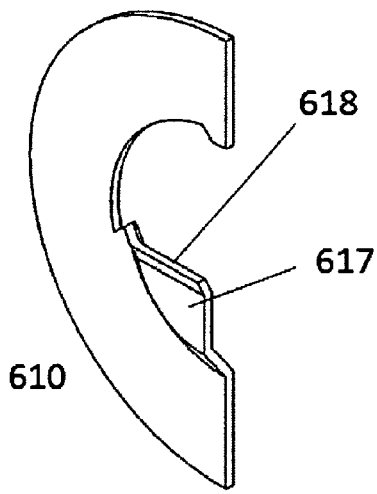
Figure 13F:
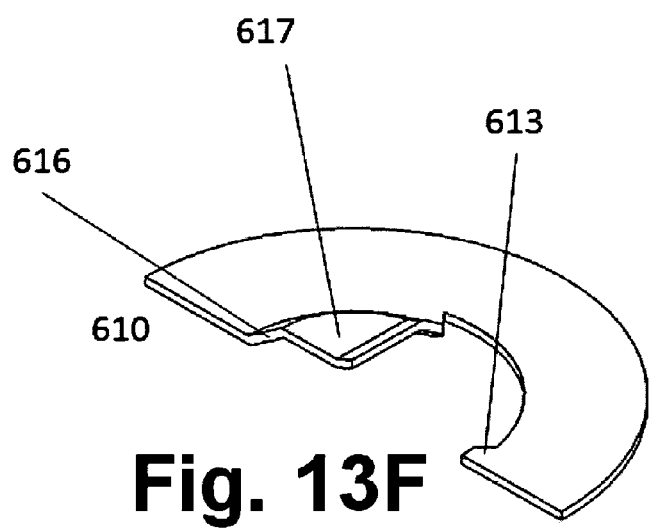
Figure 13G:
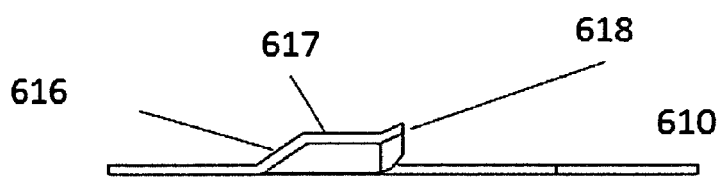

FIGS. 13A to 13G are views of another embodiment of a hinge member 610. As shown in FIGS. 13A to 13G, a hinge member 610 may have a hinge including an approach 616, a step 617, and a lip 618. The approach 616 may extend upward away from a flange body 611 until it reaches a step 617. The step 617 may be flat, rounded, straight, or angled. A lip 618 may extend outwardly from the step 617. As illustrated in FIGS. 13A-13G, the lip 618 may extend upward from the step 617, generally in the direction away from the plane of the flange body 611 (as best illustrated in FIG. 13G).

In operation, the hinge member 610 of FIGS. 13A to 13G may be positioned on the outlet side (i.e., downstream) of a rupture disk. When the rupture disk bursts, a rupture disk petal may come into contact with the hinge of the hinge member 610. If a hinge lip 618 extends upward (toward the rupture disk), as illustrated in FIGS. 13A to 13G, then the rupture disk petal may initially contact the hinge lip 618 before it contacts the hinge step 617 or hinge approach 616. In response to the impact from the rupture disk petal, one or more of the lip 618, step 617, and approach 616 of the hinge may deform in sequence to provide a multi-stage response to rupture disk rupture.

The hinge member 610 of FIGS. 13A to 13G may be used in conjunction with a platform hinge. In that alternative embodiment, the hinge member 610 of FIGS. 13A to 13G may deform or collapse when impacted by a rupture disk petal, thereby absorbing energy and momentum and slowing down the movement of the rupture disk petal. Then, as that hinge member collapses, it may contact the platform hinge of a second member, which may absorb the remaining kinetic energy of the petal and collapsed/collapsing hinge.

The shape of cross-section of a collapsible hinge may be selected to control the strength of the hinge and the force under which the collapsible hinge will deform. In addition, the transition between a collapsible hinge and a hinge member's flange body may be selected to control or influence the amount of force under which the collapsible hinge will deform. The transition may be abrupt. Alternatively, the transition may have a radius of curvature. In another alternative embodiment, a transition area may be provided between the collapsible hinge and the flange body.

Figure 14A:
FIGS. 14A-14C illustrate different embodiments of a second hinge member and a platform hinge according to the present disclosure.
Figure 14B:
Figure 14C:
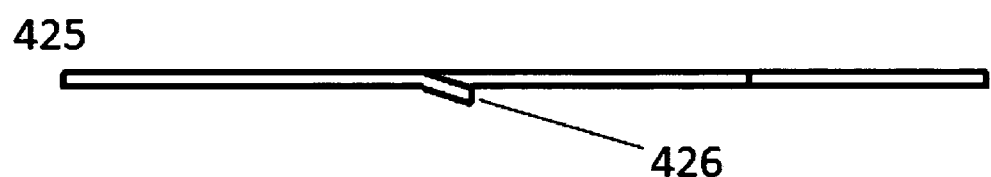

FIGS. 14A to 14C are illustrations of different embodiments of a second hinge member. As noted above, a second hinge member 421 may have a platform hinge 422 that is co-planar with the second hinge member's flange body, as illustrated in FIG. 14A. Alternatively, a second hinge member 423 may have a platform hinge 424 that may be angled toward the rupture disk's domed portion (as illustrated in FIG. 14B). A second hinge member 425 may alternatively have a platform hinge 426 that is angled away from the rupture disk's domed portion (as illustrated in FIG. 14C).

A hinge assembly, first hinge member, and second member according to the present disclosure may be manufactured using a simple forming process. For example, both of the first and second hinge members may be cut from a sheet metal. The desired shape of the collapsible hinge and/or the platform hinge may be added by a simple pressing process or mechanical forming process (e.g., stamping, laser cutting, or progressive die processes). Accordingly, the present disclosure may provide a cost-effective solution to prevent rupture disk fragmentation.

Figure 15A:
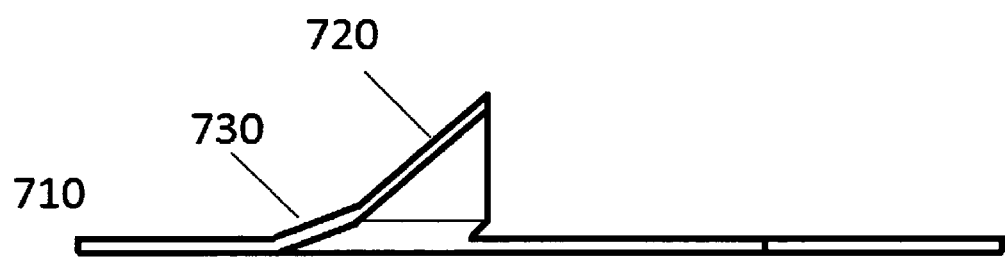
FIGS. 15A-15B illustrate an embodiment of a single collapsible hinge member having a two-stage response.
Figure 15B:
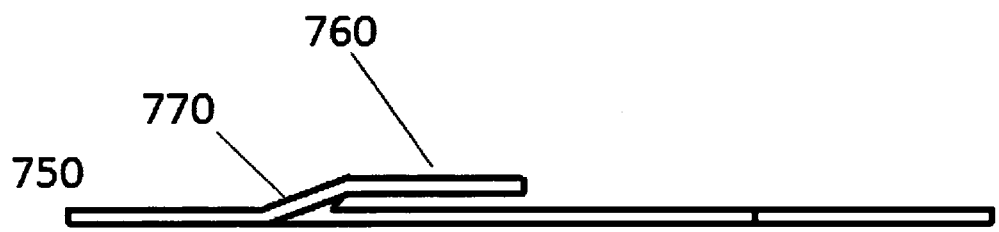

While the above described embodiments have been depicted as using a hinge assembly made of a first and a second hinge member, the disclosure is not limited to that structure. For example, a single hinge member may be provided with similar functionality to the two-member design. A single hinge member may be provided with a two-stage response to rupture disk rupture. For example, a first portion 720 of a single hinge member 710 (illustrated in FIG. 15A) may deform when contacted by a rupture disk petal, and a second portion 730 of the single hinge member (illustrated in FIG. 15A) may deform after the first portion 720 has deformed. As another example, a hinge member 750 may include a "diving board" type of hinge, as illustrated in FIG. 15B. As shown in FIG. 15B, a first portion 760 of a hinge member may extend (at least partially) along a diameter of a hinge member 750. When a rupture disk activates, a rupture disk petal may wrap itself around the hinge member shown in FIG. 15B, thereby slowing down and preventing fragmentation. A second portion 770 of a hinge member 750 may deform after the first portion 760 has deformed. In another alternative embodiment, a hinge assembly may be provided with more than two hinge members. For example, a hinge assembly may have multiple collapsible hinges, with each collapsible hinge configured to absorb a portion of the kinetic energy of a rupture disk petal.

Figure 18:
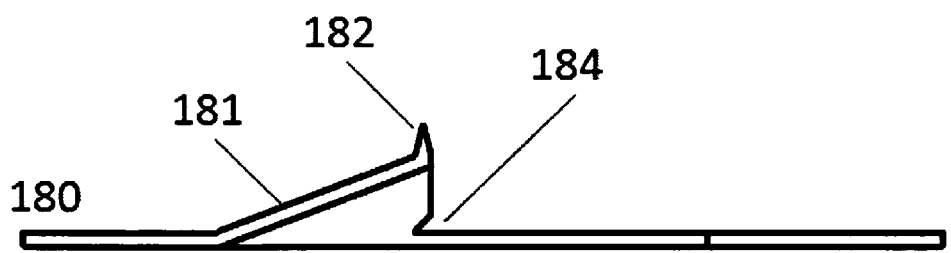
FIG. 18 illustrates an embodiment of a hinge member with a piercing element.

The above described embodiments have been depicted as using a hinge assembly to catch a portion of a rupture disk petal after a rupture disk has burst. It is also contemplated that a structure may be provided to capture the petal in a different manner. For example, one or both of the hinge members may be provided with a feature to pierce the rupture disk petal, thereby absorbing burst energy to decelerate the petal. In one embodiment, a first hinge member 180 may include a piercing element (as illustrated in FIG. 18), and a second hinge member may be provided with a platform hinge to catch the piercing element after the piercing element has pierced a rupture disk petal and/or after the first hinge member 180 has deformed upon piercing and/or catching a rupture disk petal. In another embodiment, a piercing element may be provided to a single hinge member used without a second hinge member or platform hinge.

Figure 16A:
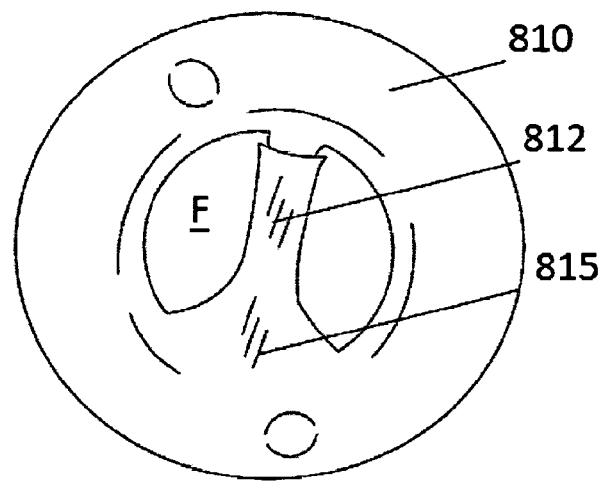
FIGS. 16A-16C illustrate different views of a rupture disk assembly, post-activation, according to the present disclosure.
Figure 16B:
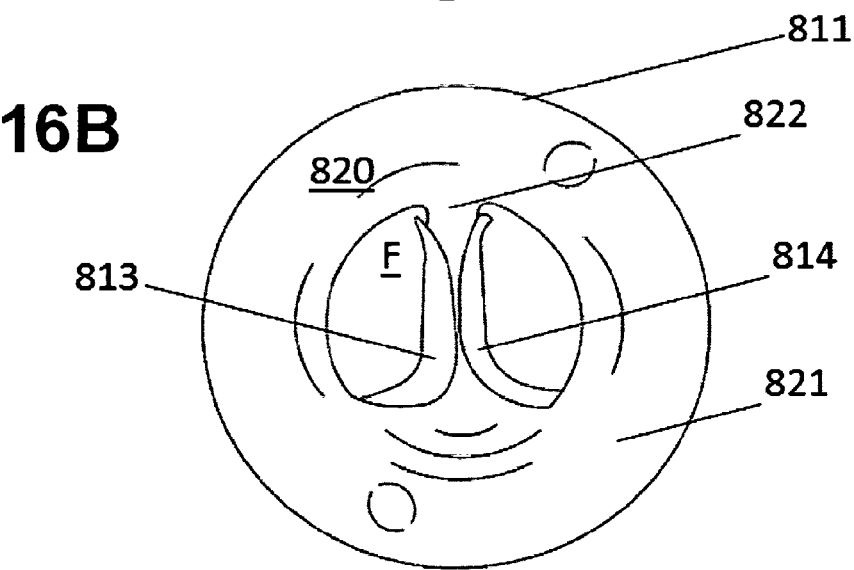
Figure 16C:
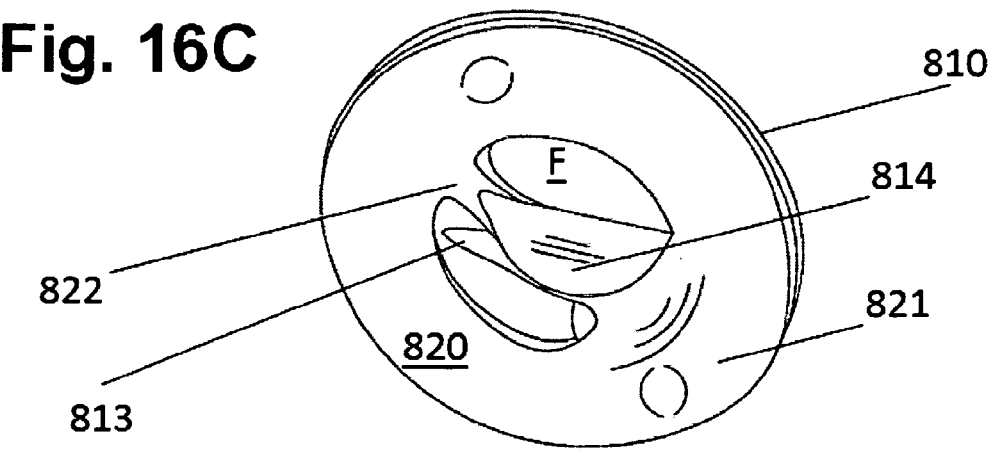

It is contemplated that a hinge may be used to cause a rupture disk to open in more than one petal. For example, as illustrated in FIGS. 16A to 16C, a hinge member 820 may have a hinge flange body 821 defining central fluid flowpath F. A hinge extension 822 may extend from the flange body 821 at least partially into the central fluid flowpath F. The hinge extension 822 may extend along a diameter of the central fluid flowpath F, and may extend entirely across a diameter (as illustrated in FIGS. 16A to 16C). A rupture disk 810 may be used with the hinge member, as illustrated in post-rupture condition in FIGS. 16A to 16C. The rupture disk 810 may have a hinge area 815, as illustrated in FIG. 16A. In one embodiment, the rupture disk 810 may be partially scored or intermittently scored, and a hinge area 815 or hinge areas may be created by one or more unscored areas of the rupture disk 810. In another embodiment a rupture disk 810 may be fully scored (i.e., 360 degrees around the disk), and a hinge area 815 may be created in the rupture disk by way of the support and reinforcement offered by a hinge member 820.

According to the embodiment of FIGS. 16A to 16C, when a rupture disk 810 bursts, a first rupture disk petal 812 may contact a hinge extension 822. In one embodiment, the hinge extension 822 may deform in response to the impact from a rupture disk petal 812, thereby absorbing kinetic energy from the first petal 812. The hinge extension 822 may cause the first petal 812 to further separate, at least partially, into multiple petals (e.g., the second 813 and third 814 petals illustrated in FIGS. 16B and 16C). Separation of the first petal 812 into multiple petals may diffuse at least some of the kinetic energy from the first petal 812. In one embodiment, the second 813 and third 814 petals may wrap at least in part around a hinge extension 822 (as illustrated in FIGS. 16B and 16C), thereby absorbing kinetic energy from the petals. Additionally, as the second 813 and third 814 petals wrap around the hinge extension 822, they may come into contact with each other (as illustrated in FIGS. 16B and 16C), which may also diffuse kinetic energy of the petals.

FIGS. 17A to 17D illustrate different embodiments of a hinge member similar to that of FIGS. 16A-16C, in which a hinge extension (172, 174, 176) extends across a fluid flow path defined by a flange body (171, 173, 175). It is contemplated that the hinge extension may be symmetrical (as illustrated in FIG. 17A) or asymmetrical (as illustrated in FIGS. 17B and 17C). A hinge extension may extend in the same plane as a flange body. Alternatively, as illustrated in FIG. 17D, a hinge extension 178 may extend outside the plane of a flange body 177. For example, a hinge extension may extend toward or away from a rupture disk as desired. A hinge member such as illustrated in FIGS. 17A to 17D may be a first hinge member, and may form part of a hinge assembly along with a second hinge member. In such an embodiment, the second hinge member may be provided with a platform hinge configured to align with a hinge extension (172, 174, 176, 178) and contact the hinge extension in the event that the hinge extension deforms after being contacted by a rupture disk and/or rupture disk petal. Thus, it is contemplated that a platform hinge of a second hinge member may extend across a diameter of the second hinge member in a fashion similar to the extension of the hinge extension illustrated in FIGS. 17A-17D.

The above described embodiments of a rupture disk have been depicted as utilizing spherically domed rupture disks; however, the disclosure is not intended to be limited to this particular shape. Therefore, alternative rupture disks are intended to be within the scope of this disclosure, including all equivalent shapes of domes, and ovoid and other shapes that are substantially arcuate in cross section. Alternatively, a rupture disk may be substantially conically shaped, or in the shape of a truncated cone. Also, although the above described embodiments of a rupture disk have been depicted as being made of metal, this disclosure is not intended to be limited to that material alone. Therefore, embodiments of the described rupture disk may also be made of any other suitable material, such as plastic or ceramic.

It is contemplated that individual features of one embodiment may be added to, or substituted for, individual features of another embodiment. Accordingly, it is within the scope of this disclosure to cover embodiments resulting from substitution and replacement of different features between different embodiments.

The above described embodiments and arrangements are intended only to be exemplary of contemplated mechanisms and methods. Other embodiments will be apparent to those skilled in the art from consideration of the specification and practice of the disclosure herein.

What is claimed is:

1. A hinge assembly for a rupture disk having a rupturable domed portion, the hinge assembly comprising:
   a first hinge member comprising a flange body and a collapsible hinge; and
   a second hinge member comprising a platform hinge;
   wherein the collapsible hinge is configured to be positioned between the rupturable domed portion of the rupture disk and the platform hinge; and
   wherein the collapsible hinge is configured to come into contact with the platform hinge upon collapse of the collapsible hinge.

2. The hinge assembly of claim 1, wherein the collapsible hinge defines a partial dome shape.

3. The hinge assembly of claim 1, wherein the rupturable domed portion of the rupture disk has a first radius of curvature and the collapsible hinge defines a second radius of curvature.

4. The hinge assembly of claim 3, wherein the first radius of curvature and the second radius of curvature curve in the same direction.

5. The hinge assembly of claim 3, wherein the first radius of curvature and the second radius of curvature curve in opposite directions.

6. The hinge assembly of claim 1, wherein the rupturable domed portion of the rupture disk has a concave surface, and wherein the collapsible hinge is configured to extend toward the concave surface.

7. The hinge assembly of claim 1, wherein the collapsible hinge extends across a diameter of the first hinge member.

8. The hinge assembly of claim 1, further comprising:
   at least one notch defined at an intersection of the flange body and the collapsible hinge.

9. The hinge assembly of claim 1, wherein the platform hinge is provided with a line of bending.

10. The hinge assembly of claim 1, wherein the flange body of the first hinge member and the collapsible hinge define a central fluid flow path, and wherein the central fluid flow path is D-shaped.

11. The hinge assembly of claim 1, wherein at least one of the first hinge member and the second hinge member further comprises a stress concentration point.

12. The hinge assembly of claim 11, wherein the first hinge member comprises a stress concentration point, and wherein the stress concentration point is positioned opposite from the collapsible hinge.

13. The hinge assembly of claim 12, wherein the stress concentration point is a first stress concentration point, and wherein the second hinge member further comprises a second concentration point.

14. The hinge assembly of claim 13, wherein the second concentration point is positioned opposite from the platform hinge.

15. The hinge assembly of claim 1, wherein the first hinge member further comprises a piercing element configured to pierce the rupture disk.

16. The hinge assembly of claim 15, wherein the piercing element is provided on the collapsible hinge.

17. A rupture disk assembly comprising:
   a rupture disk comprising a flange portion and a domed portion, wherein the domed portion has a concave surface;
   a first hinge member comprising a flange body and a collapsible hinge; and
   a second hinge member comprising a flange body and a platform hinge;
   wherein the flange body of the first hinge member is configured to be sealed between the flange portion of the rupture disk and the flange body of the second hinge member.

18. The rupture disk assembly of claim 17, wherein the rupture disk is provided with a line of weakness defining a line along which the rupture disk will rupture in response to a predetermined pressure.

19. The rupture disk assembly of claim 17, wherein the domed portion of the rupture disk is provided with an indentation, wherein the indentation is configured to initiate deformation of the rupture disk at a predetermined pressure.

20. The rupture disk assembly of claim 17, wherein at least one of the first hinge member and second hinge member further comprises a stress concentration point configured to contact the rupture disk upon activation of the rupture disk.

21. The rupture disk assembly of claim 17, wherein the rupture disk is configured to rupture in response to a predetermined pressure, and wherein the collapsible hinge is configured to contact the rupture disk upon rupture.

22. The rupture disk assembly of claim 21, wherein the collapsible hinge is configured to collapse when contacted by the rupture disk and wherein the platform hinge is configured to contact the collapsible hinge upon rupture.

23. The rupture disk assembly of claim 19, wherein the rupture disk is a reverse-buckling rupture disk.

24. The rupture disk assembly of claim 19, wherein the collapsible hinge is configured to extend toward the concave surface of the rupturable portion.

25. A rupture disk hinge, comprising:
a flange body defining a first plane;
a collapsible hinge, wherein the collapsible hinge comprises:
an approach extending from the flange body, wherein the approach extends away from the first plane;
a platform extending from the approach, wherein the platform extends parallel to the first plane; and
a lip extending from the platform.

26. The rupture disk hinge of claim 25, wherein the lip extends away from the first plane.

27. The rupture disk hinge of claim 25, wherein the lip extends toward the first plane.

28. The rupture disk hinge of claim 25, further comprising:
a stress concentration point.

29. The rupture disk hinge of claim 28, wherein the stress concentration point extends from the flange body opposite from the collapsible hinge.

30. The rupture disk hinge of claim 25, further comprising:
at least one notch defined between the flange body and the approach extending from the flange body.

31. The rupture disk hinge of claim 25, wherein at least two of the approach, platform, and lip are configured to collapse in succession when contacted by a rupture disk petal.

32. A rupture disk hinge, comprising:
a flange body defining a plane;
a collapsible hinge, wherein the collapsible hinge comprises:
a first hinge extension extending from the flange body at a first angle relative to the plane of the flange body; and
a second extension extending from the first hinge extension at a second angle relative to the plane of the flange body, wherein the second hinge extension is configured to deform when contacted by a rupture disk petal;
wherein the first hinge extension is configured to deform after the second hinge extension deforms.

33. A rupture disk hinge assembly, comprising:
a flange body defining a central fluid flow path;
a hinge extension extending along a diameter of the flange body completely across the central fluid flow path, wherein the hinge extension bisects the fluid flow path; and
wherein the hinge extension is configured to catch a portion of a rupture disk upon rupture.

34. The rupture disk hinge assembly of claim 33, further comprising:
the rupture disk, the rupture disk having a petal portion configured to at least partially detach from the rupture disk upon rupture of the rupture disk.

35. The rupture disk hinge assembly of claim 34, wherein the hinge extension is configured to catch the petal portion upon rupture of the rupture disk.

36. The rupture disk hinge assembly of claim 35, wherein the hinge extension is configured to cause the petal portion to wrap around the hinge extension upon rupture of the rupture disk.

37. The rupture disk hinge assembly of claim 35, wherein the hinge extension is configured to separate the petal portion into at least two petal portions upon rupture of the rupture disk.

38. The rupture disk hinge assembly of claim 33, wherein the flange body defines a plane and wherein the hinge extension extends away from the flange body above the plane.

* * * * *